US009137002B2

(12) United States Patent
Rayne (10) Patent No.: US 9,137,002 B2
(45) Date of Patent: Sep. 15, 2015

(54) COMMUNICATIONS SYSTEMS (75) Inventor: Mark Wentworth Rayne, Cambridgeshire (GB)

(73) Assignee: SEPURA PLC, Cambridge (GB)

( * ) Notice: Subject to any disclaimer, the term of this patent is extended or adjusted under 35 U.S.C. 154(b) by 880 days.

(21) Appl. No.: 13/147,414

(22) PCT Filed: Feb. 3, 2010

(86) PCT No.: PCT/GB2010/000187
§ 371 (c)(1),
(2), (4) Date: Aug. 2, 2011

(87) PCT Pub. No.: WO2010/089543
PCT Pub. Date: Aug. 12, 2010

(65) Prior Publication Data
US 2011/0287799 A1    Nov. 24, 2011

(30) Foreign Application Priority Data
Feb. 3, 2009    (GB) .................................. 0901713.8

(51) Int. Cl.
*H04W 28/20*    (2009.01)
*H04L 5/00*    (2006.01)

(52) U.S. Cl.
CPC ............. *H04L 5/0064* (2013.01); *H04W 28/20* (2013.01); *H04L 5/0007* (2013.01); *H04L 5/0091* (2013.01)

(58) Field of Classification Search
CPC ............................. H04W 28/16; H04W 28/20
USPC ........... 455/509, 452.1, 450, 500, 510, 67.11; 370/329
See application file for complete search history.

(56) References Cited

U.S. PATENT DOCUMENTS

| 2007/0265011 A1* | 11/2007 | Han et al. ........................ 455/437 |
| 2009/0040973 A1* | 2/2009 | Iwai et al. ....................... 370/329 |
| 2009/0175369 A1* | 7/2009 | Atarashi et al. ................ 375/260 |
| 2009/0239545 A1* | 9/2009 | Lee et al. ........................ 455/450 |

FOREIGN PATENT DOCUMENTS

| EP | 1981194 | 10/2008 |
| EP | 1983783 | 10/2008 |
| EP | 1983783 A1 | 10/2008 |
| EP | 2114031 | 11/2009 |

(Continued)

OTHER PUBLICATIONS

PCT International Search Report, dated Apr. 26, 2010, PCT Patent Application No. PCT/GB2010/000187.

(Continued)

*Primary Examiner* — John J Lee
(74) *Attorney, Agent, or Firm* — Vierra Magen Marcus LLP (57) ABSTRACT

A method and system that allows a mobile station of a communications system to request and be granted a fraction (a sub-set) of the overall frequency bandwidth of a communications channel for its transmissions. Thus, for example, in a TETRA system, a mobile station can, instead of having to request and be granted the full frequency bandwidth of an, e.g., 150 kHz QAM channel, request and be granted only a portion or fraction of the 150 kHz bandwidth of the channel, such as a 25 kHz portion of it. This allows the requested and allocated transmission resources to be more readily optimized to the amount of data that a mobile station wishes to transmit.

14 Claims, 3 Drawing Sheets

(56) References Cited

FOREIGN PATENT DOCUMENTS

| | | |
|---|---|---|
| WO | WO 97/11566 | 3/1997 |
| WO | WO 03/003646 | 1/2003 |
| WO | WO 2007/126301 | 11/2007 |

OTHER PUBLICATIONS

Office Action dated Oct. 22, 2014 in European Patent Application No. EP107027278, 5 pages.

* cited by examiner

COMMUNICATIONS SYSTEMS

The present application is a Section 371 National Stage Application of International Application No. PCT/GB2010/000187, filed on Feb. 3, 2010, which claims the benefit of GB0901713.8, filed on Feb. 3, 2009, the entire disclosure of which are incorporated herein by reference in their entirety.

The present invention relates to communications systems and in particular to the requesting and granting of transmission resources in a mobile communications system, such as the TETRA (TErrestrial Trunked RAdio) system.

It is known in many communications systems to provide transmission channels having different data capacities, which communications station can then use depending, e.g., on the amount of data they may have to transmit and the rate and/or signal quality at which they may wish to transmit that data.

For example, the ETSI TETRA standard EN 300 392-2 v 3.2.1 supports the use of 25 kHz, 50 kHz, 100 kHz and 150 kHz channels using QAM modulation, with 8 sub-carriers per 25 kHz, for packet data transmissions.

In a TETRA system that supports such communications channels, a mobile station (MS) may be allocated to a channel of any bandwidth from 25 to 150 kHz. A mobile station is able to ask for a wider bandwidth channel if it thinks the signal quality is high enough. Similarly a mobile station can request removal to a narrower-bandwidth channel if it thinks the present signal quality is inadequate.

The data throughput will be reduced on a narrower bandwidth channel, but in some cases this may not be as important as signal quality.

One example of a case where signal quality is particularly important is where a mobile station wishes to transmit "real-time" data. Speech and live video are examples of real-time data. When sending speech, the mobile station only wants to send each packet of speech data once and then move on to the next speech packet. It does not have time to resend faulty data packets because the next item of speech or video is arriving. If the channel quality is poor the speech packets will be lost, and the received speech will be of poor quality or unintelligible. Beyond a certain bit rate there is no value in increasing the throughput available for real-time data, as the data is only generated at a limited rate.

Note that in TETRA, mobile stations use the same mean RF power whether they are transmitting in high bandwidth channels or low bandwidth channels. This means that the power per subcarrier is higher in a low bandwidth transmission, and the energy per symbol is thus higher in a low bandwidth channel, allowing a higher signal quality but with lower throughput.

For general packet data use, TETRA allocates many mobile stations to a single packet data channel. They contend for access to the channel using random access. A mobile station's random access attempt includes an estimate of the quantity of uplink resource required (in timeslot and sub-slot units). If the base station (system infrastructure) receives the random access attempt, and it has transmission resource available, it sends the mobile station a message giving it blocks of timeslots to use. These timeslots encompass the whole channel width (i.e. they use all the sub-carriers making up the channel).

It has been recognised that a problem that can arise with, for example, the use of 150 kHz channels in TETRA, is that the minimum grantable resource element of the channel (which can be referred to as the "sub-slot"), which is approximately half a timeslot, is in many cases too large (i.e. the sub-slot capacity may greatly exceed the actual resource required by a mobile station to send a small acknowledgement message, etc.), and, moreover, that this is wasteful of air interface resource.

In particular, the duration of a TETRA timeslot is 14.667 ms. The smallest transmission resource allocation unit in a TETRA is a sub-slot, which is designed to fit into half of a time-slot, including allowances for transmitter ramp-up and ramp-down times and a guard time to allow for varying distances of a mobile station from a base station (as the data transmission of a distant mobile station may not be received correctly by a base station if the end of that transmission strays into the next half time slot as received by the base station, because the distant mobile station's transmission may then be swamped by the ramping up of a local mobile station).

In TETRA using QAM modulation, the ramp-up and ramp-down times are 2.0 and 2.5 symbol periods respectively and the duration of the data transmission is 13.0 symbol periods (EN 300 392-2 v3.2.1 clause 6.4.10). A half-slot lasts 17 symbol periods. The QAM symbol rate is 2400 symbols/s per subcarrier (EN 300 392-2 v3.2.1 clause 5.11), so the QAM symbol period is 416.7 μs. Thus the actual data transmission time is 5.4 ms, which is 73% of the total duration of half a time slot (i.e. 27% of the transmission time is used in ramping up and down and guard time).

After removing overheads from the data transmission (i.e. pilot symbols and header symbols), an uplink sub-slot will contain the following numbers of payload symbols:
25 kHz pi/4 DQPSK 84 symbols (126 data bits at r=⅔)
25 kHz QAM: 76 symbols (76 data bits at 4-QAM r=½)
50 kHz QAM 160 symbols (160 data bits at 4-QAM r=½)
100 kHz QAM 328 symbols (328 data bits at 4-QAM r=½)
150 kHz QAM 496 symbols (496 data bits at 4-QAM r=½)

However, TETRA is designed so that many important messages (e.g. acknowledgements and resource requests) will each occupy (fit into) a single pi/4 DQPSK sub-slot, which has a capacity of 126 bits. Thus, on a 150 kHz channel, the minimum resource allocation of one subslot (which as noted above corresponds to 496 bits) will be much larger than is needed for many occasions.

A new "Broadband TETRA" standard is being considered by ETSI TETRA. This would support much higher data rates than offered by the present TETRA standard (which as discussed above offers QAM modulation in channels of up to 150 kHz bandwidth). Broadband TETRA is expected to offer channels in excess of 1 MHz bandwidth (perhaps up to 8 MHz).

If extended to a broadband version of TETRA with e.g. 1 MHz channels comprising 320 QAM subcarriers, one would have:
1 MHz 3306 symbols (3306 data bits at 4-QAM r=½)
(Using 4-QAM modulation with coding rate ½, the number of data bits after removal of the channel coding is equal to the number of symbols.)

In a 1 MHz "broadband" channel, the minimum resource allocation unit will be greatly in excess of the minimum requirement. If a mobile station were to put its 120-bit message into a 1 MHz bandwidth subslot, the remaining 3186 bits would be unavailable for use by any other mobile station (and thus wasted).

Thus with Broadband TETRA, the problem identified by the Applicants will be much worse.

One solution would be to introduce a new shorter-duration resource unit, e.g. a quarter-slot or an eighth-slot duration transmission. However, the Applicants have recognised that this introduces another inefficiency.

In particular, as described above, a QAM transmitter requires 4.5 symbol periods for ramping up and down (see EN 300 392-2 v3.2.1, clause 9.4.8.1). Thus, in a quarter slot uplink transmission (with a duration of 8.5 symbols), there would be only 4 symbols periods available for transmission of payload data; i.e. more than 50% of the resource unit would be used for ramping up and down.

Thus, reducing the minimum resource granting element to a smaller temporal fraction of a time slot (e.g. a quarter slot or an eighth slot duration) would not help much, because a mobile station requires a finite time to ramp its transmitter up and down.

The Applicants believe therefore that there remains scope for improvements in the allocation of resources for transmissions in communications systems, such as the TETRA system.

Thus, according to a first aspect of the present invention, there is provided a method of operating a communications system in which communications stations of the system can request and be granted transmission resources for making their transmissions, and which communications system supports the use of one or more communications channels having a given frequency bandwidth, the method comprising:

a communications station transmitting a request for the allocation of a transmission resource comprising a fraction of the overall frequency bandwidth of a communications channel of the system;

the system infrastructure, in response to such a request, allocating the communications station a fraction of the overall frequency bandwidth of a communications channel of the system for its transmission; and the communications station transmitting in the allocated fraction of the bandwidth of the communications channel.

According to a second aspect of the present invention, there is provided a communications system in which communications stations of the system can request and be granted transmission resources for making their transmissions, and which communications system supports the use of one or more communications channels having a given frequency bandwidth, the system comprising:

one or more communications stations comprising means for transmitting a request for the allocation of a transmission resource comprising a fraction of the overall frequency bandwidth of a communications channel of the system; and a system infrastructure comprising means for, in response to such a request, allocating a communications station a fraction of the overall frequency bandwidth of a communications channel of the system for its transmission.

In the present invention, a communications station, such as (and preferably) a, mobile station, of a communications system can request and be granted a fraction (a sub-set) of the overall frequency bandwidth of a communications channel for its transmissions (i.e. can request (and be granted) an allocation of a particular sub-bandwidth of a communications channel).

Thus, for example, in a TETRA system, a mobile station could, e.g., instead of having to request and be granted the full frequency bandwidth of an, e.g., 150 kHz QAM channel, request and be granted only a portion or fraction of the 150 kHz bandwidth of the channel, such as a 25 kHz portion of it.

In other words, in the present invention, a communications station can request and be granted transmission resources, such as sub-slots and slots, that are reduced in (frequency) bandwidth (and can request and be granted only some but not all (a fraction of) the overall frequency bandwidth of a communications channel).

This will then allow, for example, a mobile station to be allocated a smaller resource unit or element within the capacity of a given communications channel and thereby, e.g., allow the requested and allocated resources to be more readily optimised to the amount, e.g., of data, that the mobile station wishes or has to transmit, notwithstanding that a higher bandwidth and/or data capacity channel may be being used or may have to be used.

The present invention can therefore, e.g., be used to reduce or even eliminate the amount of transmission resource (capacity) that may be wasted when making "smaller" transmissions on higher bandwidth and/or capacity channels (in contrast to the current situation with existing communications systems, as discussed above).

This will allow, inter alia, the channel usage efficiency and signal quality of communications stations, such as mobile stations, using a high bandwidth channel to be increased.

The present invention will thus be particularly useful, e.g., where a mobile station has very little data to send, or wishes to use a low bit rate for its transmission either for reliability reasons or because it is sending real-time data (e.g. voice) that does not require the full bandwidth of the channel or both. (As discussed above, increased reliability will arise because the mobile station is able to deliver its full transmission power through a narrower "sub-channel" bandwidth, thus increasing the energy per transmitted symbol.)

The present invention also extends to the operation solely of the communications station, such as (and preferably) a mobile station, transmitting a request for resources in the manner of the present invention.

Thus, according to a third aspect of the present invention, there is provided a method of operating a communications station of a communications system, the method comprising:

the communications station transmitting a request to the system infrastructure of the communications system for the allocation of a transmission resource comprising a fraction of the overall frequency bandwidth of a communications channel of the system.

According to a fourth aspect of the present invention, there is provided a communications station of a communications system, comprising:

means for transmitting a request for the allocation of a transmission resource comprising a fraction of the overall frequency bandwidth of a communications channel of the communications system.

The present invention similarly extends to the operation of the system infrastructure, such as a base station and/or the switching and management infrastructure (SwMI), granting transmission resources to a communications station in the manner of the present invention.

Thus, according to a fifth aspect of the present invention, there is provided a method of operating the system infrastructure of a communications system in which communications stations of the system can request and be granted transmission resources for making their transmissions, and which communications system supports the use of one or more communications channels having a given frequency bandwidth, the method comprising:

the system infrastructure allocating to a communications station of the communications system a fraction of the overall frequency bandwidth of a communications channel of the system for its transmission.

According to a sixth aspect of the present invention, there is provided a communications system infrastructure in which communications stations of the system can request and be granted transmission resources for making their transmissions, and which communications system supports the use of one or more communications channels having a given frequency bandwidth, the system infrastructure comprising:

means for allocating to a communications station of the communications system a fraction of the overall frequency bandwidth of a communications channel of the system for its transmission.

In these arrangements and aspects of the invention, the system infrastructure will, as discussed above, typically, and in a preferred embodiment does, grant transmission resources to a communications station in this manner in response to a corresponding request for resources from a communications station.

However, it would also be possible for the system infrastructure to grant resources in this manner to a communications station of its own volition (i.e. not only in response to a request from a communications station, and, e.g., and preferably, without needing any such request from a communications station).

For example, the system infrastructure could, and in a preferred embodiment does, allocate resources to communications stations in this manner based, e.g., on the available transmission resources, current system conditions, etc. It preferably may also do so even if a communications station requests, e.g., a "full" channel allocation if, e.g., there is a need or desire to in fact share a channel among plural communications stations.

For example, if the system infrastructure sends (via a base station) a higher-layer message to a mobile station that requires a response from the mobile station, the system infrastructure could, if desired and appropriate (e.g. because only a "small" response is required or expected), include with the higher layer message a resource grant or allocation in the manner of the present invention for the mobile station to use for its response. Similarly, where a mobile station has, e.g., agreed a schedule with the system infrastructure for real-time data, so that the system infrastructure periodically sends the mobile station new resource grants without further requests from the mobile station, then those resource grants could again, if desired and appropriate, be resource grants in the manner of the present invention.

The resource request that the communications station transmits in the present invention may take any suitable and desired form. It preferably indicates the bandwidth that the communications station desires for its transmission. This may, e.g., be in the form of an absolute bandwidth value or range, or may, e.g., indicate directly the desired fraction or proportion of the channels over all bandwidth (such as requesting one ½ or one ¼ of the channel's bandwidth).

Where, as is the case in a TETRA system, a given channel is made up of multiple sub-carriers within the overall bandwidth of the channel, each such sub-carrier or set of sub-carriers effectively occupying a given frequency range within the bandwidth of the channel (at least when modulated with a signal), then in one particularly preferred embodiment, the communications station's request indicates the desired fraction of the channel bandwidth in terms of the number of sub-carriers and/or the range of sub-carriers that it desires.

(As is known in the art, the ETSI TETRA standard EN 300 392-2 v3.2.1 describes the use of multiple sub-carriers using QAM modulation, with modulation symbols on each sub-carrier, and 8 sub-carriers per 25 kHz (so that a 150 kHz channel has 48 sub-carriers).)

In a particularly preferred embodiment, the resource request message indicates the requested bandwidth in terms of a predefined size or unit of bandwidth, which in the case of a TETRA system is preferably 21.6 kHz or 25 kHz. (As is known in the art, in the TETRA system, although TETRA channels are presently allocated in certain multiples of 25 kHz, and they contain 8 sub-carriers per 25 Hz of bandwidth, the sub-carriers are in fact evenly spaced at intervals of 2.7 kHz (EN 300 392-2 v 3.1.1 clause 5.15) arranged symmetrically about the centre frequency of the channel. Thus a block of 8 sub-carriers actually occupies a bandwidth of 21.6 kHz (and there will be a "gap" at the upper and lower edges of the channel that depends on the channel bandwidth). Thus a "25 kHz", 8-sub-carrier bandwidth allocation in fact corresponds to a "true" bandwidth allocation of 21.6 kHz, located relative to the centre frequency of the channel. Thus, references herein to 25 kHz bandwidth blocks in a TETRA system are intended to refer equally to (and effectively to) such 21.6 kHz bandwidth blocks, and vice-versa, and so should be interpreted accordingly (unless the context requires otherwise).)

Other arrangements would, of course, be possible.

In a preferred embodiment, the communications station's resource request also indicates the number of timeslots that the communications station desires for its transmission.

In a particularly preferred embodiment, the resource request message also or instead (and preferably also) indicates the total transmission resource being requested, preferably in the form of a total number of resource units being requested by the communications station. There is preferably a standard, predefined resource unit size for this purpose, which is preferably defined in terms of a predefined (frequency) bandwidth and number of timeslots. In a TETRA system, the resource unit size is preferably a 25 kHz (21.6 kHz; 8 sub-carriers) by 1 timeslot (or by ½ a timeslot) block. Other arrangements would, of course, be possible.

In a particularly preferred embodiment, there is a predefined resource request message that a communications station may use. This message may take any suitable form, but in a TETRA system is preferably in the form of a MAC-ACCESS PDU (Protocol Data Unit).

In a preferred embodiment, one or more additional items are included in the resource request. These additional items preferably include one or more of: a data priority element (indicating what priority the system (e.g. base station) should assign to the requested resource); a data class element, indicating whether the transmission resource request is for real time class data or some other class of data; and a flag indicating whether a minimum or maximum bandwidth is being specified in the request.

The communications station may request a reduced-bandwidth resource grant in the manner of the present invention as desired (and does not need to do this for every resource request it makes). It preferably does this at least when it has only a single small acknowledgement to send, and/or when it has a real-time transmission which needs to be sent with low delay and high reliability but does not have a high-enough bit rate to fill the entire channel bandwidth.

For example, and preferably, a mobile station requiring to transmit only a small quantity of data on the present channel may indicate in its resource request that it wants to be granted one time slot at less than the full channel bandwidth.

Similarly, a mobile station requiring to transmit a quantity of data at a limited bit rate with high reliability (e.g. real time data) may and preferably does indicate in its resource request that it needs to be granted multiple timeslots but restricted to a fraction of the total bandwidth of the channel.

The resource request message may be transmitted by the communications station (to the system infrastructure) in any suitable and desired fashion, such as by random access (as part of a random access attempt) or by including it in another message, e.g. depending on how such resource requests are normally made in the communications system in question.

The system infrastructure may allocate the appropriate transmission resource to the communications system in any suitable and desired manner.

In a preferred embodiment, the communications station is allocated a specified (frequency) bandwidth within the overall (frequency) bandwidth of the channel. This bandwidth may be distributed within the overall communications channel bandwidth as desired, although in a particularly preferred embodiment the portion (fraction) of the bandwidth allocated to the communications station is a contiguous portion of bandwidth within the overall bandwidth of the channel (and thus preferably the communications station is allocated a set of adjacent sub-carriers within the channel, where the communications channel is made up of plural sub-carriers across the bandwidth of the channel as discussed above).

The bandwidth is preferably allocated to the communications station in terms of units of a particular, preferably predefined, amount of bandwidth (and/or a particular set of sub-carriers), such as, and preferably, in units of 25 kHz (21.6 kHz) (i.e. 8 adjacent sub-carriers), at least in the case of a TETRA QAM channel.

The system infrastructure preferably also grants a number of timeslots on the granted bandwidth (although it could be as little as one subslot) to the communications station for its transmission. Thus in a particularly preferred embodiment, the system infrastructure grants a communications station a transmission resource allocation comprising a given (frequency) bandwidth allocation within the communications channel and one or more timeslots (or subslots) on that bandwidth allocation.

Where, as discussed above, and as may be the case in a TETRA system, a given communications channel is made up of multiple sub-carriers within the overall channel, then preferably the system infrastructure allocates a communications station a given set of sub-carriers within the overall set of sub-carriers making up the communications channel (preferably, as discussed above, together with a number of timeslots (or subslots) on those sub-carriers).

In this case, the set of sub-carriers allocated to a particular communications station is preferably adjacent and preferably appropriately aligned, e.g. to a 25 kHz grid in the case of a TETRA QAM channel.

In a particularly preferred embodiment, the system infrastructure can make plural resource allocations simultaneously. For example, and preferably, the system infrastructure can and preferably does allocate other portions or fractions of the bandwidth of the channel (e.g. other sets of sub-carriers making up the channel) to other communications stations at the same time. This will then allow, e.g., plural communications stations to share the overall bandwidth of the communications channel simultaneously.

The system infrastructure can preferably also grant and allocate to a communications station a set of successive transmission resource allocations, for example to be used one after another in time. The successive transmission resource allocations are preferably each on the same frequency and/or use the same bandwidth. However, this is not essential, and it would also, e.g., be possible for a subsequent resource allocation to use a different portion of the channel's bandwidth, if desired.

The system infrastructure preferably communicates the transmission resource allocation to the communications station by sending the communications station an appropriate grant message to that effect.

This grant message may take any suitable and desired form. As discussed above, it preferably indicates the bandwidth that the system infrastructure is allocating to the communications station for its transmission. This may, e.g., be indicated in the resource grant message as desired, for example by providing lower and upper frequencies (frequency values) defining the bandwidth allocated to the communications station, or, e.g., by indicating a single start point frequency (preferably the lower frequency of the bandwidth range) together with an indication of the bandwidth being allocated.

As discussed above, where, as is the case in a TETRA system, a given channel is made up of multiple sub-carriers within the overall bandwidth of the channel, then in one preferred embodiment the resource grant message indicates the specific set of sub-carriers that the communications station is being allocated. Most preferably this set of sub-carriers is adjacent and aligned to an appropriate frequency grid, and is in units of a given frequency range.

In a particularly preferred embodiment, the resource grant message indicates the allocated bandwidth in terms of a predefined size of unit of bandwidth. This may be in terms of a predefined bandwidth frequency range, or, e.g., where appropriate, in terms of a given number of sub-carriers within a channel. In the case of a TETRA system, this predefined "unit" of bandwidth is preferably 25 kHz (21.6 kHz) and/or a set of 8 adjacent sub-carriers. Other arrangements would, of course, be possible.

In a preferred embodiment, and as discussed above, the resource grant message also indicates the number of timeslots that is being allocated to the communications station for its transmission within the allocated (specified) bandwidth.

In a particularly preferred embodiment, the resource grant message also or instead (and preferably also) indicates a total of transmission resource being granted to a communications station. This may be done as desired, and there is preferably a standard, predefined resource unit size for this purpose.

In one preferred such arrangement, the predefined resource unit's size is defined in terms of a predefined (frequency) bandwidth and number of timeslots. In a TETRA system, this resource unit's size is preferably a 25 kHz (21.6 kHz; 8 sub-carriers) by 1 timeslot (or by half a timeslot) block. Other arrangements would, of course, be possible. In this case the duration of the transmission resource granted, in timeslots, will be given by the resource units being granted divided by the number of simultaneous timeslots (e.g. the number of sub-channels) within the bandwidth being allocated to the communications station.

In another preferred arrangement, the total transmission resource being granted is specified in terms of the number of elapsed timeslots (or subslots) being granted (i.e. the duration of the resource being granted in timeslots (essentially the number of timeslots being granted per sub-channel where the allocation is made up of plural parallel (simultaneous) sub-channels)). This may allow the total resource being granted to be specified using fewer transmitted bits in the resource grant message (as it should be a smaller number).

In a preferred embodiment, the resource grant message includes an indication of a granting "delay", which indicates the time at which the resource allocation being granted is to begin. This is preferably given in terms of a number of timeslot units.

In a preferred embodiment, one or more other additional items are also included in the resource grant message. These additional items may, and preferably do, include, for example, an implicit repeat count (as shown in the EN 300 392-2).

In a particularly preferred embodiment, there is a predefined resource grant message that a system infrastructure may use (and that may be transmitted by a base station to a requesting communications station). This message may take any suitable form.

As will be appreciated from the above, this predefined resource grant message will preferably include one or more of, and preferably all of, the following elements or fields (pieces of information): an indication of a granting "delay", which indicates the time at which the resource allocation grant begins (preferably in terms of a number of timeslots); an indication of the bandwidth being allocated to the communications station (preferably by giving a lower frequency value and an upper frequency value (such as a lower frequency sub-channel number and an upper frequency sub-channel number, where appropriate) that thereby defines the allocated bandwidth to the communications station (e.g. defines the set of, e.g., 25 kHz, frequency blocks (and, e.g.; contained sub-carriers) being granted to the communications station)); and an indication of the total transmission resource being allocated to the communications station (preferably, as discussed above, in terms of the number of "resource units" being granted (which may, as discussed above, e.g., be in terms of a number of timeslots, or in terms of bandwidth by time blocks)).

It would be possible for the resource grant message to be a "stand-alone" message that may be sent by the system infrastructure as desired. However, in a preferred embodiment, the resource grant message may be, and preferably is, included as an (optional) information element in another message that the system infrastructure is to send. For example, in a TETRA system, the resource grant message is preferably included in (as an optional information element in) a MAC-RESOURCE PDU (Protocol Data Unit).

In a particularly preferred embodiment, the system infrastructure can transmit to a communications station a message that includes plural resource grant messages of the form discussed above (i.e. can transmit to a communications station a set of plural individual resource grant messages in a single message). In this case, the message preferably also includes an indication of how many different resource grants (grant messages) it contains.

This will then allow, as discussed above, the system infrastructure to allocate plural successive sets of transmission resource to a communications station using a single message.

The present invention may be used and applied in relation to any desired and suitable form of communications channel (i.e. a channel whose bandwidth can be sub-divided when allocating it to communications stations). In the case of a TETRA system the channel may be, and preferably is, a higher bandwidth QAM channel of the type discussed above.

The communications station in the present invention may be any suitable such station or communications terminal, such as a mobile station or a base station. It may also be a suitable fixed (TETRA) terminal, such as a dispatcher terminal.

The present invention may also be applied analogously to communications systems operating in so-called "Direct Mode" (i.e. where mobile stations communicate with each other directly, and not via the "fixed" system infrastructure). In this case, a Direct Mode repeater or gateway may, e.g., grant transmission resources in the manner of the present invention to a mobile station(s) using the repeater or gateway, and/or mobile stations could select (allocate) their own bandwidth fractions for transmission.

As will be appreciated by those skilled in the art, the present invention will be particularly applicable to the requesting and granting of transmission resources for the uplink (i.e. mobile station to base station (system infrastructure)) direction (since in the downlink (i.e. base station (system infrastructure) to mobile station) direction, the system infrastructure should be able to fill any spare data capacity with other messages in any event).

Thus, in a particularly preferred embodiment, the communications station is a mobile station. Similarly, the request is preferably for "uplink" transmission resources (and the intended transmission is to be in the "uplink" direction).

As will be appreciated from the above, the various operations and functions of the present invention may be carried out by and implemented in a communications station, e.g., mobile station, and/or the system infrastructure of the communications system, as desired and as appropriate.

For example, in the case of the "system infrastructure" operation, the functions, etc., may be performed by a or the base station itself, and/or by another component of the system infrastructure. They may also be performed in a distributed fashion (and the system may be implemented in a distributed fashion) in the system infrastructure if desired.

Although the present invention has been described above with particular reference to a TETRA system, the invention may be applied to other communications systems that use and support the sub-division of channel bandwidth, such as, and preferably, other mobile communications systems, such as GPRS, UMTS or 3GPP. Thus, the communications system is preferably a mobile communications system, preferably a GPRS, UMTS, 3GPP or TETRA communications system, and most preferably a TETRA communications system.

As will be appreciated by those skilled in the art, all of the aspects and embodiments of the invention described herein may and preferably do include any one or more or all of the preferred and optional features of the invention described herein, as appropriate.

The methods in accordance with the present invention may be implemented at least partially using software e.g. computer programs. It will thus be seen that when viewed from further aspects the present invention provides computer software specifically adapted to carry out a method or the methods herein described when installed on data processing means, a computer program element comprising computer software code portions for performing a method or the methods herein described when the program element is run on data processing means, and a computer program comprising code means adapted to perform all the steps of a method or of the methods herein described when the program is run on a data-processing system.

The invention also extends to a computer software carrier comprising such software which when used to operate a TETRA communications system comprising data processing means causes in conjunction with said data processing means said system to carry out the steps of a method or of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of a method or of the methods set out herein.

The present invention may accordingly suitably be embodied as a computer program product for use with a computer system. Such an implementation may comprise a series of computer readable instructions either fixed on a tangible medium, such as a computer readable medium (processor readable storage device), for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Figure 1:
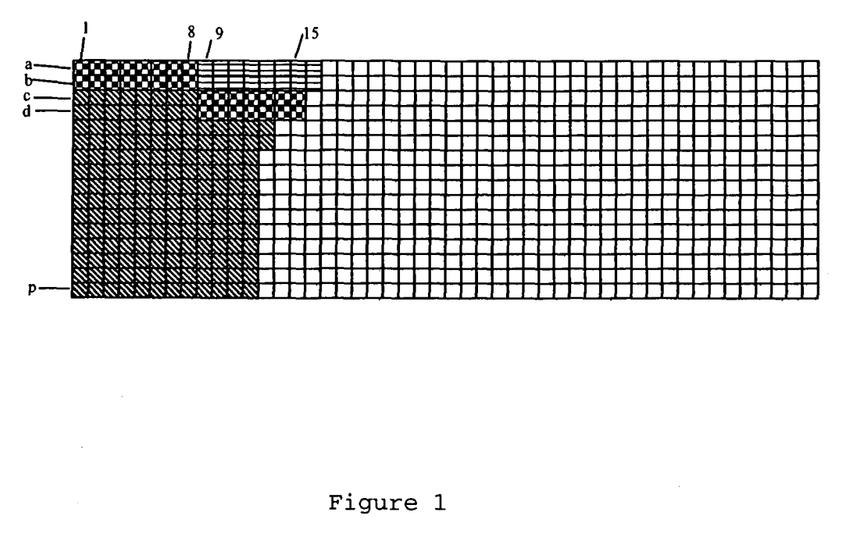
FIG. 1 shows schematically the allocation of resources on a TETRA channel in an embodiment of the present invention.

A number of preferred embodiments of the present invention will now be described by way of example only and with reference to the accompanying drawings, in which:

FIG. 1 shows schematically a portion of an exemplary 400 kHz bandwidth uplink (i.e. mobile station to base station) TETRA QAM channel.

In FIG. 1, the horizontal rows illustrate 25 kHz (21.6 kHz) portions of the channel. Each 25 kHz portion itself consists of 8 QAM subcarriers. The vertical columns illustrate timeslots.

Thus the vertical axis in FIG. 1 represents increasing frequency (in the direction a to p) in steps of 25 kHz, and the horizontal axis represents increasing time from left to right in units of TETRA timeslots (14.667 ms). Each small square thus represents 34×8=272 QAM symbols, or 272 data bits when modulated with 4-QAM r=½ modulation (this includes overheads such as pilot symbols and header symbols, ramp ups and ramp downs).

In the present embodiment, the minimum resource allocation is 25 kHz (21.6 kHz; 8 sub-carriers) bandwidth and half-a-timeslot in duration.

FIG. 1 illustrates the situation where a first mobile station requiring a real time service has requested continuous resource at 50 kHz bandwidth and, at the time of this example, has been granted 15 timeslots at 50 kHz bandwidth (timeslots a1 to a8, b1 to b8, c9 to c15 and d9 to d15 in FIG. 1).

A second mobile station has also requested a 50 kHz allocation, and has been granted resource units a9 to a16 and b9 to b16. A third mobile station has been granted a background class allocation, using up the rest of the channel (i.e. c1 to c8, d1 to d8, ..., to p1 to p8; e9 to e12, f9 to f12, ..., to p9 to p12; and e13 and f13.) (Any other mobile station requesting further resource will be granted the first available free resource units.)

In this example the resource granted to the first mobile station is disjoint—it is useful to permit the system (e.g. base station) to make allocations of this sort to give a base station the best possible opportunity of allocating all available resource units in the event that many mobile stations are making interleaved requests for resources.

Figure 2:
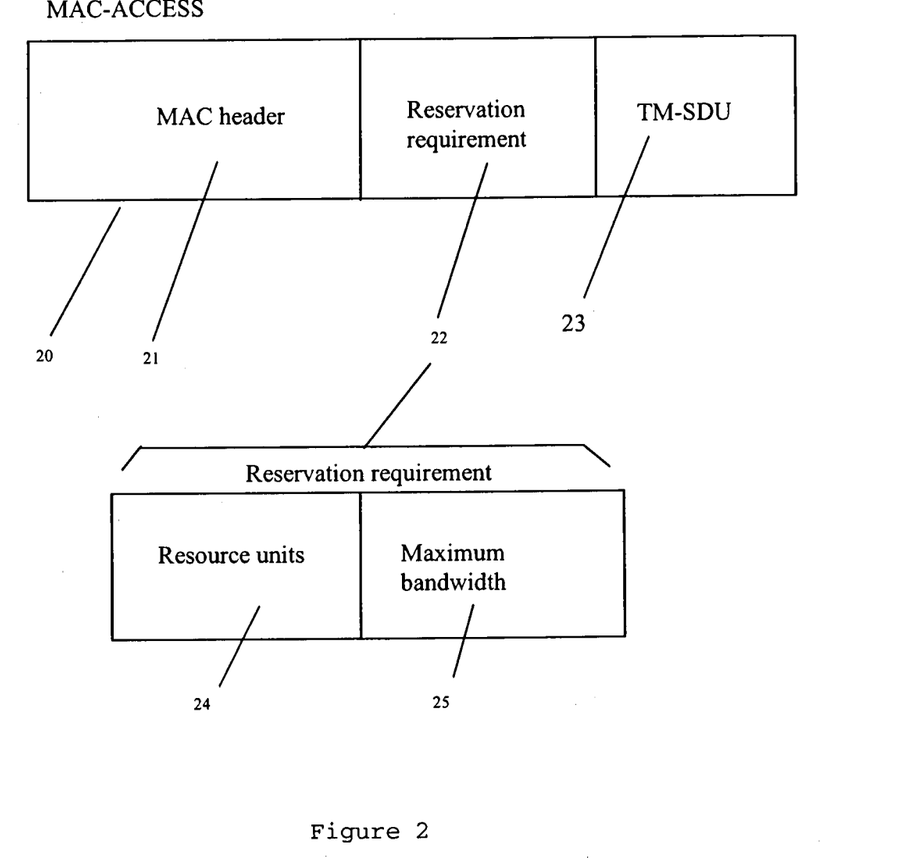
FIG. 2 shows a preferred embodiment of a radio channel resource request message for use in the present invention.

FIG. 2 shows an exemplary resource request message that may be used by a mobile station (or other communications station) in the present embodiment. This resource request message is in the form of a MAC-ACCESS PDU 20 containing a reservation requirement element 22 (a resource request element) that may be sent from a mobile station to a base station (much as defined in ETSI standard EN 300 392-2 v3.2.1 clause 21.4.2.1) in a random access request.

The MAC-ACCESS PDU 20 includes, as is known in TETRA, a MAC header 21, a reservation requirement 22, and a TM-SDU 23 (which will carry a higher layer message, as is known in the art).

Unlike its definition in the ETSI standard, the reservation requirement element 22 in this message is modified to consist of two elements, 24, 25. The first of these elements, 24, indicates the total number of resource units being requested (where a resource unit is defined in this embodiment as a 25 kHz by 1 time slot block as illustrated in FIG. 1). The second element 25 specifies the maximum requested bandwidth in 25 kHz units.

It might be useful to add additional items to this reservation requirement. Examples include a data priority element (indicating what priority the base station should assign to the requested resource), a data class element, indicating whether the reservation requirement is for real time class data or some other class of data, and a flag indicating whether minimum or maximum bandwidth is being specified.

Figure 3:
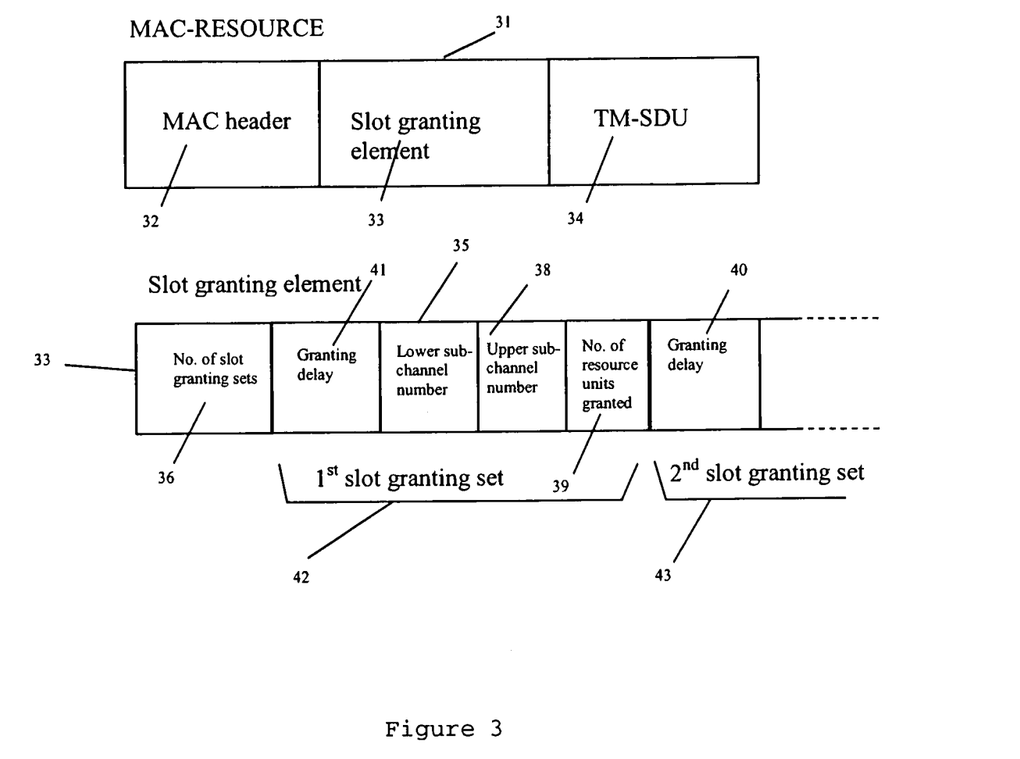
FIG. 3 shows a preferred embodiment of a radio channel resource grant message for use in the present invention.

FIG. 3 shows a corresponding exemplary resource grant message 33 that may be used by the system infrastructure (sent by a base station) to grant resources in the manner of the present invention in the present embodiment.

This resource grant message is intended to be included in a MAC-RESOURCE PDU 31 that may be sent on the downlink from a base station to a mobile station, and is based on the MAC-RESOURCE PDU defined in EN 300 392-2 v3.2.1 clause 21.4.3.1. This MAC RESOURCE PDU 31 includes, as shown in FIG. 3, a MAC header 32, the resource grant message of the present embodiment in the form of a slot granting element 33 and a TM-SDU 34 (which will carry a higher layer message, as is known in the art).

The slot granting element (resource grant message) 33 comprises, as shown in FIG. 3, one or more "slot granting sets", 42, 43 and an element 36 indicating the number of slot granting sets included in the slot granting element 33.

Each slot granting set 42, 43 comprises a granting delay field 41, a lower frequency sub-channel number 35, an upper frequency sub-channel number 38 and the number of resource units granted 39.

The granting delay 41, 40, is given in timeslot units and indicates the time at which the grant begins.

A sub-channel is defined in this embodiment as a 25 kHz frequency unit within the overall channel. The lower frequency sub-channel number 35 and the upper frequency sub-channel number 38 together define the set of 25 kHz (21.6 kHz) frequency blocks (and contained subcarriers) included in the resource grant.

The number of resource units granted 39 indicates the total number of (25 kHz by 1 time-slot) blocks included in the grant—thus the duration of the resource granted, in time slots, is given by the resource units divided by the number of sub-channels included in the grant.

(It may be convenient here to allow any remainder from this division sum to fall into one or more sub-channels in the next time slot, counting upwards from the lowest numbered granted sub-channel. Alternatively, it may be preferred to specify the resource grant in elapsed timeslots (elapsed as from the start of the grant (i.e. after counting through the granting delay)), rather than in total resource units, as this may allow the resource to be specified using fewer transmitted bits; on the other hand it loses the flexibility of using the remainder of the division sum described above.)

It might also be useful to add additional items to this resource grant. An example includes an implicit repeat count (as shown in EN 300 392-2).

The sequence and content of the resource request and grant messages for the situation illustrated in FIG. 1 will now be described.

Considering the first mobile station of FIG. 1, let it be assumed that this mobile station requires to send real-time data for an indefinite period of time. As the flow rate of the real time data will be limited, and the mobile station requires a high-reliability channel for its transmissions, it requests a large number of resource units in a maximum bandwidth of two sub-channels (i.e. in 50 kHz in this example).

(Note that although the element 25 in the resource request message 20 is labelled as "maximum bandwidth", the system infrastructure should preferably regard this as the minimum acceptable bandwidth if the system infrastructure knows that the mobile station is requesting the resource for real-time data. (As discussed above, an additional element in the reservation requirement element 22 could indicate that the request is for real time data, or whether the bandwidth request is to be regarded as a maximum or a minimum).)

The system infrastructure (base station) responds to this request by sending the first mobile station a MAC-RESOURCE PDU with a slot granting element 33 containing two slot granting sets. The first granting set allocates the mobile station to sub-channels a and b (i.e. 50 kHz) and 16 resource units (i.e. 8 timeslots duration), and the second granting set allocates the mobile station to sub-channels c and d with 14 resource units (as illustrated in FIG. 1).

(This change in sub-channels is shown as an example of what is possible, and could occur because the base station has already allocated some time slots on sub-channels a and b to a low priority reservation requirement from a second mobile station, as illustrated in FIG. 1).

Considering now the third mobile station of FIG. 1, let it be assumed that this mobile station requires 162 resource units to transmit its pending background class data. Consequently it sends a MAC-ACCESS PDU requesting 162 resource units (or an approximation to 162, depending on how the resource unit element is coded) and a maximum bandwidth equal to the bandwidth of the current channel (400 kHz in this example). The system infrastructure (e.g. base station) responds by sending this mobile station a MAC-RESOURCE PDU 31 containing a slot granting element 33 with two slot granting sets.

The first slot granting set gives a lower sub-channel number c, an upper sub-channel number p and 112 resource units, which corresponds to 14 sub-channels for a duration of 8 timeslots.

The second slot granting set gives a granting delay of zero (because it follows in the timeslot immediately after the first slot granting set), a lower sub-channel number e, an upper sub-channel number p and 50 resource units.

The mobile station deduces that this represents four timeslots duration over 12 sub channels and two remaining resource units in a fifth time slot in the two lowest of the allocated sub-channels, i.e. sub-channels e and f (as shown in FIG. 1).

(In the alternative method where the resource unit's element 39 is instead indicated as elapsed timeslots, the second slot granting set in this example would give an elapsed time of four timeslots and a third slot granting set would be required to specify the remaining two resource units. The third granting set could, e.g., be sent at a later time, for example attached to an acknowledgement to some of the earlier data.)

Although the present invention has been described above with particular reference to a TETRA communications system (and its use in a TETRA system is particularly preferred), as discussed above the present invention may analogously be applicable to other communications systems, such as GPRS (GSM), UMTS, and 3GPP communications systems. The present invention can thus equally be applied to such communications systems, using, for example, the same principles and techniques as outlined above in the context of a TETRA system.

As can be seen from the above, the present invention, in its preferred embodiments at least, can, inter alia, provide a means for a mobile station sending real time data to share a higher bandwidth, e.g., broadband multicarrier, channel with other mobile stations, including ones sending background class (e.g. best effort) data. It also provides an efficient means of making small slot grants on a higher bandwidth, e.g., broadband, channel.

This is achieved, in the preferred embodiments of the present invention at least, by allowing, inter alia mobile stations, to request and be granted transmission resources in the form of fractions of the overall bandwidth of a communications channel.

The invention claimed is:

1. A method of operating a communications system in which communications stations of the system can request and be granted transmission resources for making their transmissions, and which communications system supports the use of one or more communications channels having a given frequency bandwidth, the method comprising:

a communications station transmitting a request for the allocation of a transmission resource comprising a fraction of the overall frequency bandwidth of a communications channel of the system;

the system infrastructure, in response to such a request, allocating the communications station a fraction of the overall frequency bandwidth of a communications channel of the system for its transmission; and the communications station transmitting in the allocated fraction of the bandwidth of the communications channel.

2. A method of operating a communications station of a communications system, the method comprising:

the communications station transmitting a request to the system infrastructure of the communications system for the allocation of a transmission resource comprising a fraction of the overall frequency bandwidth of a communications channel of the system wherein the communications station's resource request indicates at least one of: the desired fraction of the channel bandwidth in terms of the number of sub carriers or the range of sub carriers within the overall bandwidth of the channel that the communications station desires, and the number of timeslots that the communications station desires for its transmission.

3. A method of operating the system infrastructure of a communications system in which communications stations of the system can request and be granted transmission resources for making their transmissions, and which communications system supports the use of one or more communications channels having a given frequency bandwidth, the method comprising:

the system infrastructure allocating to a communications station of the communications system a fraction of the overall frequency bandwidth of a communications channel of the system for its transmission, and the system infrastructure allocating different fractions of the bandwidth of the channel to different communications stations at the same time.

4. The method of claim 3, comprising the system infrastructure granting and allocating to a communications station a set of successive transmission resource allocations to be used one after another in time.

5. The method of claim 3, wherein the system infrastructure sends a resource grant message to the communications station that includes an indication of the time at which the resource allocation being granted is to begin.

6. The method of claim 3, wherein the communications system is a communications system that is operating in a direct mode of operation where mobile stations communicate with each other directly and not via a fixed system infrastructure, and the system infrastructure that allocates the fraction of the frequency bandwidth of the communications channel to the communications station comprises a mobile communications station that is operating in the direct mode, a direct mode repeater, or a direct mode gateway.

7. A communications system in which communications stations of the system can request and be granted transmission resources for making their transmissions, and which communications system supports the use of one or more communications channels having a given frequency bandwidth, the system comprising:

one or more communications stations comprising a transmitter that transmits a request for the allocation of a transmission resource comprising a fraction of the overall frequency bandwidth of a communications channel of the system; and a processor that, in response to such a request, allocates a communications station a fraction of the overall frequency bandwidth of a communications channel of the system for its transmission.

8. A communications station, comprising:

a transmitter that transmits a request for the allocation of a transmission resource comprising a fraction of the overall frequency bandwidth of a communications channel of the communications system wherein the request for the allocation of the transmission resource indicates at least one of:

the desired fraction of the channel bandwidth in terms of the number of sub carriers or the range of sub carriers within the overall bandwidth of the channel that the communications station desires, and the number of timeslots that the communications station desires for its transmission.

9. A communications system infrastructure of a communications system in which communications stations of the system can request and be granted transmission resources for making their transmissions, and which communications system supports the use of one or more communications channels having a given frequency bandwidth, the system infrastructure comprising:

a processor that allocates to a communications station of the communications system a fraction of the overall frequency bandwidth of a communications channel of the system for its transmission;

wherein the processor allocates different fractions of the bandwidth of the channel to different communications stations at the same time.

10. The communications system infrastructure of claim 9, wherein the processor grants and allocates to a communications station a set of successive transmission resource allocations to be used one after another in time.

11. The communications system infrastructure of claim 9, wherein the processor sends a resource grant message to the communications station that includes an indication of the time at which the resource allocation being granted is to begin.

12. The communications system infrastructure of claim 9, wherein the communications system is a communications system that is operating in a direct mode of operation where mobile stations communicate with each other directly and not via a fixed system infrastructure, and the system infrastructure that allocates the fraction of the frequency bandwidth of the communications channel to the communications station comprises a mobile communications station that is operating in the direct mode, a direct mode repeater, or a direct mode gateway.

13. A non-transitory computer readable medium comprising computer software code for programming a computer system to perform a method comprising:

a communication station transmitting a request to a system infrastructure of a communication system for the allocation of a transmission resource comprising a fraction of an overall frequency bandwidth of a communications channel of the communication system wherein the communications station's resource request indicates at least one of: the desired fraction of the channel bandwidth in terms of the number of sub carriers or the range of sub carriers within the overall bandwidth of the channel that the communications station desires, and the number of timeslots that the communications station desires for its transmission.

14. A non-transitory computer readable medium comprising computer software code for programming a data processing system to perform a method of operating a system infrastructure of a communications system in which communications stations of the system can request and be granted transmission resources for making their transmissions, and which communications system supports the use of one or more communications channels having a given frequency bandwidth, the method comprising:

the system infrastructure allocating to a communications station of the communications system a fraction of the overall frequency bandwidth of a communications channel of the system for its transmission, and the system infrastructure allocating different fractions of the bandwidth of the channel to different communications stations at the same time.

* * * * *